(12) United States Patent
Dupaquis et al.

(10) Patent No.: US 7,266,579 B2
(45) Date of Patent: Sep. 4, 2007

(54) COMBINED POLYNOMIAL AND NATURAL MULTIPLIER ARCHITECTURE

(75) Inventors: Vincent Dupaquis, Peypin (FR); Laurent Paris, Rousset (FR)

(73) Assignee: Atmel Corporation, San Jose, CA (US)

( * ) Notice: Subject to any disclaimer, the term of this patent is extended or adjusted under 35 U.S.C. 154(b) by 667 days.

(21) Appl. No.: 10/615,476

(22) Filed: Jul. 7, 2003

(65) Prior Publication Data

US 2004/0199560 A1 Oct. 7, 2004

(30) Foreign Application Priority Data

Apr. 4, 2003 (FR) .................................. 03 04221

(51) Int. Cl.
*G06F 7/52* (2006.01)
*G06F 7/38* (2006.01)

(52) U.S. Cl. ...................... 708/620; 708/491
(58) Field of Classification Search ............... 708/620, 708/625, 491–492

See application file for complete search history.

(56) References Cited

U.S. PATENT DOCUMENTS

| 4,037,093 A | 7/1977 | Gregg et al. ................ 235/164 |
| 4,251,875 A | 2/1981 | Marver et al. .............. 364/754 |
| 4,797,848 A | 1/1989 | Walby ......................... 364/754 |
| 4,847,801 A | 7/1989 | Tong ........................ 364/746.1 |
| 4,875,211 A | 10/1989 | Murai et al. ................ 371/40.1 |
| 4,918,638 A | 4/1990 | Matsumoto et al. ..... 364/746.1 |
| 5,046,037 A | 9/1991 | Cognault et al. ........ 364/746.1 |
| 5,414,719 A | 5/1995 | Iwaki et al. ............... 371/37.1 |
| 5,502,665 A | 3/1996 | Im .......................... 364/746.1 |
| 5,602,767 A | 2/1997 | Fettweis et al. ......... 364/746.1 |
| 5,642,367 A | 6/1997 | Kao ........................... 371/40.1 |
| 5,734,600 A * | 3/1998 | Dieffenderfer et al. ..... 708/625 |
| 5,768,168 A | 6/1998 | Im .......................... 364/746.1 |
| 5,812,438 A | 9/1998 | Lan et al. ................. 364/746.1 |
| 5,951,677 A | 9/1999 | Wolf et al. .................. 712/228 |
| 5,956,265 A * | 9/1999 | Lewis ......................... 708/625 |
| 5,999,959 A | 12/1999 | Weng et al. ................ 708/492 |
| 6,003,057 A | 12/1999 | Dworkin et al. ........... 708/492 |
| 6,026,420 A | 2/2000 | DesJardins et al. ........ 708/492 |

(Continued)

OTHER PUBLICATIONS

J. Garcia et al., "A Combined 16-Bit Binary and Dual Galois Field Multiplier," IEEE Workshop on Signal Processing Systems, Oct. 16, 2002, pp. 63-38, XP-10616578.

(Continued)

*Primary Examiner*—Tan V. Mai
(74) *Attorney, Agent, or Firm*—Schneck & Schneck; Thomas Schneck; Mark Protsik (57) ABSTRACT

Integrated circuit parallel multiplication circuits, including multipliers that deliver natural multiplication products and multipliers that deliver polynomial products with coefficients over GF(2). A parallel multiplier hardware architecture arranges the addition of partial products so that it begins in a first group of adder stages that perform additions without receiving any carry terms as inputs, and so that addition of the carry terms is deferred until a second group of adder stages arranged to follow the first group. This intentional arrangement of the adders into two separate groups allows both the polynomial product to be extracted from the results of the first group of additions, and the natural product to be extracted from the results of the second group of additions.

14 Claims, 6 Drawing Sheets

U.S. PATENT DOCUMENTS

| | | | |
|---|---|---|---|
| 6,101,520 A | 8/2000 | Lan et al. | 708/492 |
| 6,134,572 A | 10/2000 | Wolf et al. | 708/492 |
| 6,138,134 A | 10/2000 | Matsuo | 708/492 |
| 6,252,959 B1 | 6/2001 | Paar et al. | 380/28 |
| 6,314,186 B1 | 11/2001 | Lee et al. | 380/28 |
| 6,314,187 B1 | 11/2001 | Menkhoff et al. | 380/28 |

OTHER PUBLICATIONS

W. Drescher et al., "VLSI Architectures for Multiplication in GF ($2^m$) for Application Tailored Digital Signal Processors", 1996 IEEE, pp. 55-64, XP-000827643.

K.C. Bickerstaff et al., "Parallel Reduced Area Multipliers", Journal of VLSI Signal Processing Systems, Apr. 1995, Dordrecht, NL, pp. 181-191, XP 000525881.

Luigi Dadda, "Composite Parallel Counters", IEEE Transactions on Computers, vol. C-29, No. 10, Oct. 1980, pp. 942-946, XP-000757822.

C.S. Wallace, "A Suggestion for a Fast Multiplier", IEEE Transaction on Electronic Computers, Feb. 1964, pp. 14-17.

M.J. Sebastian Smith, "Application-Specific Integrated Circuits", Addison-Wesley, 1987, 5 pages.

Website printout: vlsi.wpi.edu/webcourse, D. Mlynek and Y. Leblebici, Design of VLSI Systems, "Arithmetic For Digital Systems", Chapter 6, 1998, 39 pages.

Paper by Dadda, (from a paper presented at the Colloque sur l'Algebre de Boole, Grenoble France, Jan. 1965.) (no copy enclosed).

* cited by examiner

COMBINED POLYNOMIAL AND NATURAL MULTIPLIER ARCHITECTURE

TECHNICAL FIELD

The present invention relates to semiconductor integrated circuit architectures, in particular multiplication circuits.

BACKGROUND ART

Multiplication hardware is usually adapted to carry out natural multiplication (the normal arithmetic one learns in grade school), but on binary numbers. In natural multiplication two operands A and B are multiplied together to form a product C=A·B, where A, B and C are represented by binary digits $a_i$, $b_j$ and $c_k$ equal to 0 or 1:

$$A = (a_{n-1}, \ldots, a_1, a_0) = SUM_i(a_i \cdot 2^i);$$

$$B = (b_{n-1}, \ldots, b_1, b_0) = SUM_j(b_j \cdot 2^j);$$

$$C = (c_{2n-1}, \ldots, c_1, c_0) = SUM_k(c_k \cdot 2^k).$$

Here, the indices i, j and k represent the bit significance or "weight" of the particular digit. (Similar number representations, such as twos-complement or ones-complement, are commonly used to represent negative integers, as well as the mantissa of real numbers. Multiplication using these other number representations is likewise similar, with appropriate modifications.)

In parallel multiplier architectures, the product is typically formed as a sum of cross-products. The partial product of two operand bits is equivalent to a logic AND operation and can be carried out in circuit hardware by using AND gates. The SUM of two partial product bits of equal weight produces a sum term of the same weight and a carry term of next higher weight, where the sum term is equivalent to a logic XOR operation and the carry term is equivalent to a logic AND operation:

$$x+y=\text{carry, sum}=AND(x,y), XOR(x,y).$$

Typically, hardware adders come in two main types, full-adders which add together three input bits, and half-adders which add together two input bits. The input bits might be either partial product bits, sum terms output from another adder, or carry terms. All of the input bits of whatever origin, including "carry" input bits, have exactly the same logic contribution to the adder outputs and are normally treated as being equivalent with respect to the result. (Note however, that standard cell implementations of adder circuits often give carry inputs privileged timing in the adder circuit's construction in order to minimize propagation delays and excessive switching in the overall adder array architecture.) Both types of adders produce a sum term and a carry term as outputs.

In natural multiplication, the carry terms are propagated and added to the sum terms of next higher weight. Thus, the natural product C is:

$$C = SUM_{i,j}(a_i \cdot b_j \cdot 2^{i+j})$$
$$= SUM_k((SUM_{i+j=k}(AND(a_i, b_j))) \cdot 2^k).$$

Parallel natural multiplier circuits come in a variety of architectures, differing mainly in the manner of arranging the partial product adder arrays.

Figure 1:
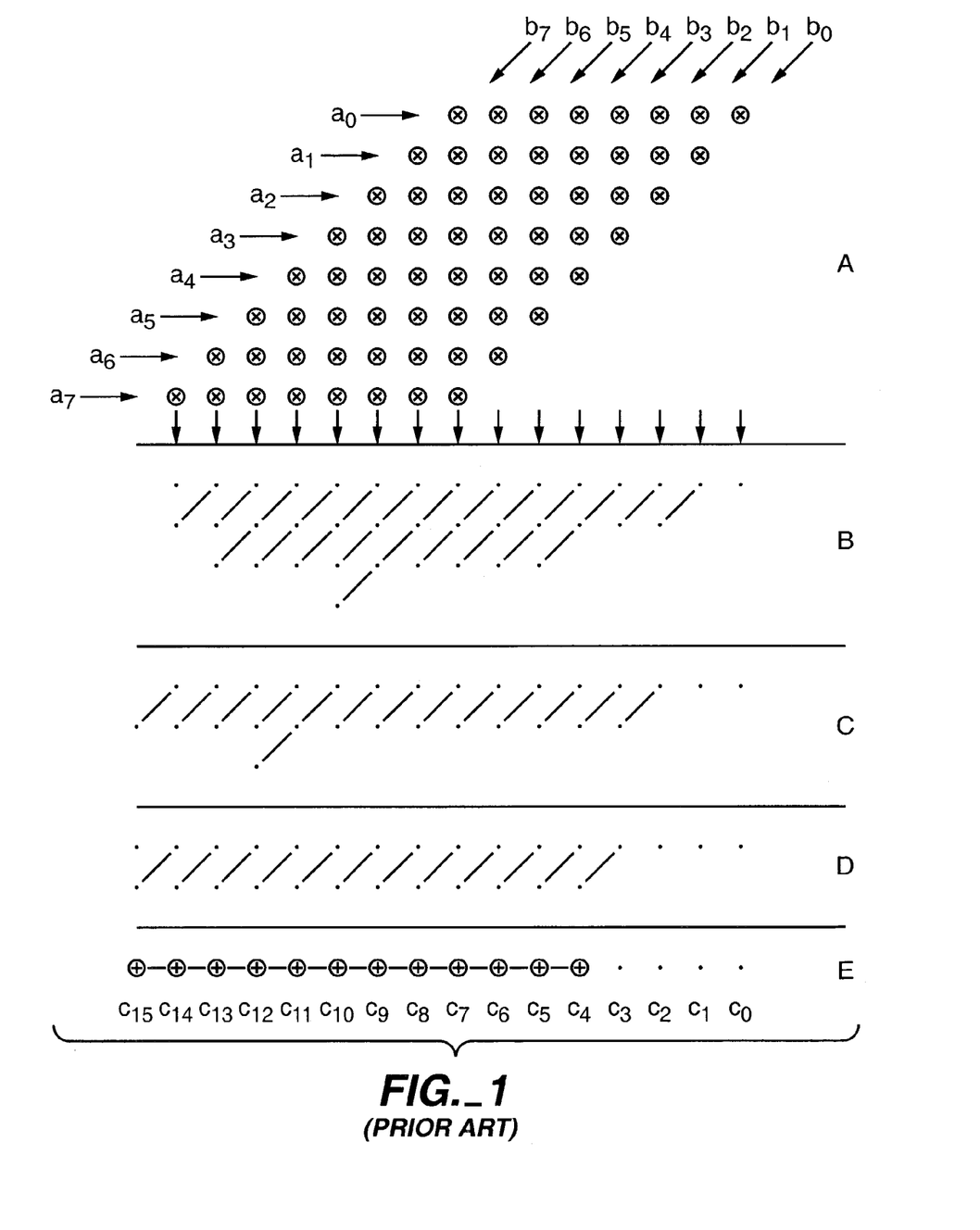
FIG. 1 is a schematic plan view of a parallel natural multiplier architecture of the prior art according to Dadda.

The architectures of Wallace (from "A Suggestion for a Fast Multiplier", IEEE Trans. on Electronic Computers, vol. EC-15, pp. 14-17, February 1964) and Dadda (from a paper presented at the Colloque sur l'Algèbre de Boole, Grenoble France, January 1965) are similar. The basic structure disclosed by L. Dadda is seen in FIG. 1. The array of partial products is represented as dots aligned in zone A in vertical columns according to their weights. The number of partial products of a given weight can vary from 1 to n for two n-bit operands. Summing the partial products of a given weight is carried out by binary counters, represented in the figure by diagonal lines. The term "binary counter" is used by Dadda and elsewhere in this document in the sense that, for a given number of input lines, it produces a binary output representing the total number or "count" of ones on those inputs. (This is different from the usual sequential counter, which produces a series of incremented outputs over time.) The summing of the partial products is divided into two main steps, in which a first step (subdivided into several cascaded stages) reduces the partial products to a set of two numbers, and a second step comprises a single carry-propagating adder stage. The cascaded stages of the first step are shown in the figure as zones B through D. The size of the counter depends on the total number of terms of a given weight which are to be counted. For example, in zone B, column 5, there are 5 partial products of weight $2^4$ to be added (counted), which together form a 3-bit sum of weights $2^6$, $2^5$, $2^4$, respectively. Thus, there are several carry terms of different weights which are propagated to the next counting stage or zone. Zones C and D apply the same principle to the outputs of the preceding zone. The output of the zone D counters is made up of two lines only. These are handled with fast adders in the second main step (in zone E) to give the natural product. Other parallel natural multipliers may use various kinds of tree structures of full-adders (or even more complex adder circuits) to rapidly reduce the partial products to a final product.

Other types of algebra have their own form of multiplication. One type commonly used in generating error-correcting codes, and more recently in elliptic curve cryptography systems (see, for example, U.S. Pat. No. 6,252,959), generates multiplication products in a finite (Galois) field. Different fields may be used, but the most common applications employ either prime number fields GF(p) or binary fields $GF(2^N)$. Error-correcting code applications, such as Reed-Solomon code generation, typically operate repeatedly on small size words, e.g. of 8 bits, and thus might use multiplication on GF(256). Elliptic curve applications typically operate on much larger blocks with word widths of 160 bits or more. Often in either of such applications, using a polynomial representation, the product is defined as a polynomial product, subsequently reduced by residue division by an appropriate irreducible polynomial. Dedicated hardware architectures have been constructed to implement finite field multiplication.

Over $GF(2^N)$, the elements of a number can be represented as either as n-uples (matrix representation) or as polynomials with n coefficients (polynomial representation):

$$A = (a_{n-1}, \ldots, a_1, a_0) = a_{n-1}x^{n-1} + \ldots + a_1x^1 + a_0x^0$$
$$= SUM_i(a_i x^i)$$

The $a_i$ are member of GF(2), i.e. can be 0 or 1. The additive and multiplication laws over GF(2) are respectively the XOR and AND logic operations. The addition of two $GF(2^N)$ numbers is defined as polynomial addition, that is addition of the coefficients of identical degree or weight:

$$C = A + B = SUM_i(XOR(a_i, b_i)x^i)$$

The multiplication of two $GF(2^N)$ numbers is defined as polynomial multiplication, modulo a specific irreducible polynomial P:

$$C = A \cdot B = (A * B) \bmod P$$
$$= SUM_k(XOR_{i+j=k}(AND(a_i, b_j))x^k) \bmod P,$$

with k from 0 to N−1. For notation, A*B represents the polynomial product (not reduced modulo P), whereas A·B represents the product of two $GF(2^N)$ numbers. A*B is a polynomial of degree 2N−2 and thus is not a member of $GF(2^N)$. A·B is a member of $GF(2^N)$.

Comparing polynomial addition and multiplication having coefficients in GF(2) to natural addition and multiplication, we observe that $a_k x^k$ (polynomial term of degree k) and $a_k 2^k$ (natural number bit of weight k) play a similar role in addition and multiplication but with some difference. The polynomial addition with coefficients in the finite field GF(2) is similar to that for natural addition, except that the sum of terms of identical degree does not provide any carry for adjacent terms in the case of polynomial addition, while the natural addition of identical weight terms does provide a carry to the next higher weight. The polynomial multiplication with coefficients in the finite field GF(2) is also similar to that for natural multiplication, except that the sum of partial products of identical degree does not generate carries for the adjacent degrees in the polynomial multiplication case, while the natural sum of partial products of the same weight terms does provide a carries to the next higher weight. Finally, we point out that the least significant bit of the natural sum of n bits is XOR of these bits, just as in the polynomial case.

In U.S. Pat. No. 4,918,638, Matsumoto et al. describe a finite field multiplier for obtaining a product in $GF(2^4)$ for use in generating error correcting codes. After performing binary multiplication, a separate polynomial generator block reduces the product with division by a generator polynomial $g(x)=x^4+x+1$. FIGS. 5 and 9 of that patent show binary multiplier arrays for performing the finite field multiplication. AND gates are used to form the partial products, while XOR gates are used to perform bit addition on the partial products of the same weight. The multiplier is not constructed to perform natural multiplication, only $GF(2^4)$ finite field multiplication.

An object of the present invention is to provide parallel multiplier architectures that are capable of delivering both a natural multiplication product and also a polynomial multiplication product with coefficients over GF(2), thus helping to accomplish finite field multiplication in $GF(2^N)$ for any values of $N \geq 1$.

DISCLOSURE OF THE INVENTION

This objective is met by a parallel multiplier hardware architecture that arranges the addition of partial products so that it begins in a first group of adder stages that perform additions without receiving any carry terms as inputs, and so that addition of the carry terms is deferred until a second group of adder stages arranged to follow the first group. This intentional arrangement of the adders into two separate groups allows both the polynomial product to be extracted from the results of the first group of additions, and the natural product to be extracted from the results of the second group of additions.

The multiplier comprises an array of AND gates with inputs connected to operand bits and with outputs providing a complete set of partial products. An addition architecture arranged to add the partial products of the same bit significance or "weight" is constructed in multiple stages. As noted, a first group of these stages adds all partial products without including any carry inputs, while a second group of stages adds carry inputs obtained from a lower weight portion of the addition architecture to results from previous stages. All of the stages provide carry outputs to a higher weight portion of the addition architecture.

In the case where the addition architecture comprises cascaded stages of parallel counters, with at least one counter in each column of two or more partial products of the same weight, the first group comprises only the first row of counters with partial product inputs, while all other rows of counters which input count bits from preceding rows of counters are part of the second group. The polynomial multiplication product is extracted from the least significant bit of each first row counter, while the natural multiplication product is extracted from carry-propagation adders receiving the final pair of count bits for each weight.

In the case where the addition architecture comprises a tree structure of full-adders for each weight, the first group of adders receive only partial product inputs and the sum terms of partial product additions. The tree structure reduces an odd number of partial products of a given weight to a single sum term which represents the binary product bit for that weight. The tree structure reduces an even number of partial products of a given weight to a pair of sum terms. An XOR gate with this pair of sum terms as inputs, then outputs the binary product bit for that weight. The second group of adders takes the sum terms from the first group and carry terms from the adder trees of next lower weight and reduces them to a second pair of sum terms. A final adder structure (e.g., carry-propagate, carry-save, 4-to-2 reductors, . . . ) then forms the natural product bits from these second sum terms.

In the case where the addition architecture comprises a tree structure of a mixture of full- and half-adders, the first group of full- and half-adders for a given weight reduces the product term inputs to a single sum term which is the binary product bit for that weight. The second group of adders then adds in the carries to obtain the natural product bit for that weight.

By separating out the carry additions into a second group, the polynomial multiplication product can be extracted from the first group, while a natural multiplication product can also be obtained.

BEST MODE OF CARRYING OUT THE INVENTION

Figure 2:
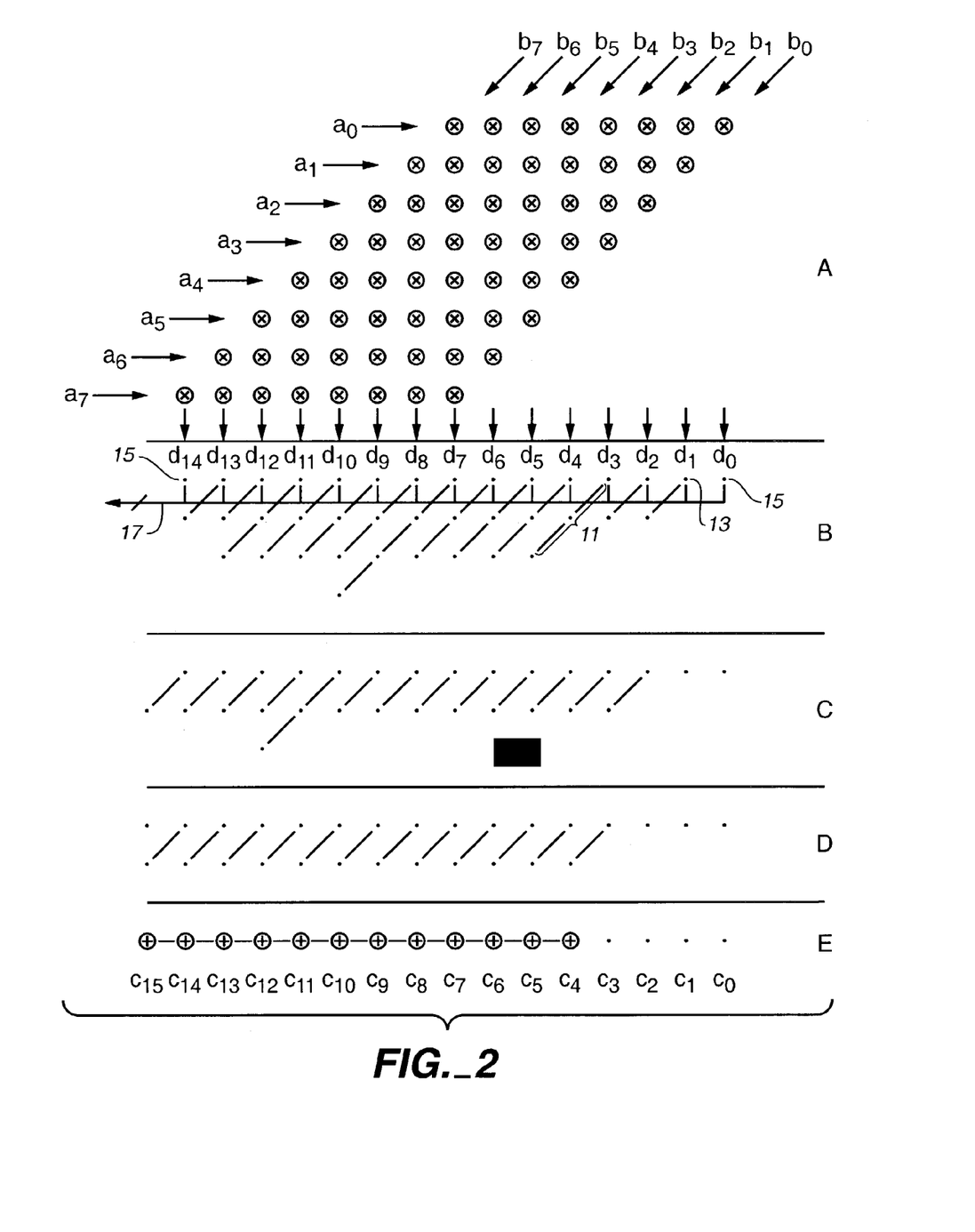
FIG. 2 is a schematic plan view of a modified version of FIG. 1 which has been provided with bit lines that extract binary product bits from internal counters as a separate output in addition to the natural product.

With reference to FIG. 2, a variation of Dadda's architecture (FIG. 1) recognizes that the least significant bit 13 from each counter 11 in zone B, together with the solo product terms 15 in the first and last columns, corresponds to the polynomial product bits for polynomials with coefficients in GF(2). These counter least significant bits 13 are extracted via bit lines 17 and provided as a polynomial product output, separate from and in addition to the natural product obtained in zone E. While these polynomial product bits could have been present as internal states of some natural multiplication circuits, as far as is known by the inventor they have not been separately extracted to make a multiplier providing both polynomial and natural products.

The recognition that sum of products in GF(2) can be present and available for extraction from within natural multiplier architectures, suggests that multipliers might be specifically designed to provide both polynomial and natural products, namely by appropriate grouping of the partial product addition architecture. This is made possible by a rearranging of the natural product C into two parts, which includes the polynomial product D and extra terms E that represent a continuation of the summing operation:

$$C = SUM_{i,j}(a_i \cdot b_j \cdot 2^{i+j})$$
$$= SUM_k((SUM_{i+j=k}(AND(a_i, b_j))) \cdot 2^k)$$
$$= SUM_k[XOR_{i, j=k-i}[AND_{i+j=k}(a_i, b_j)]2^k] + SUM_k(e_k \cdot 2^k)$$
$$= D + SUM_k(e_k \cdot 2^k)$$

where the $e_k$ are all of the carry terms of weight k obtained from the next lower weight k−1 additions. These additional terms are irrelevant to the polynomial multiplication product D, but simply continue the natural multiplication's summing to obtain the natural product C. Any multiplication architecture that separates out the carry additions into a second group of stages manages to complete the natural multiplication and yet also provide the polynomial multiplication result D from a first group of addition stages that uses only partial products and no carries.

Figure 3:
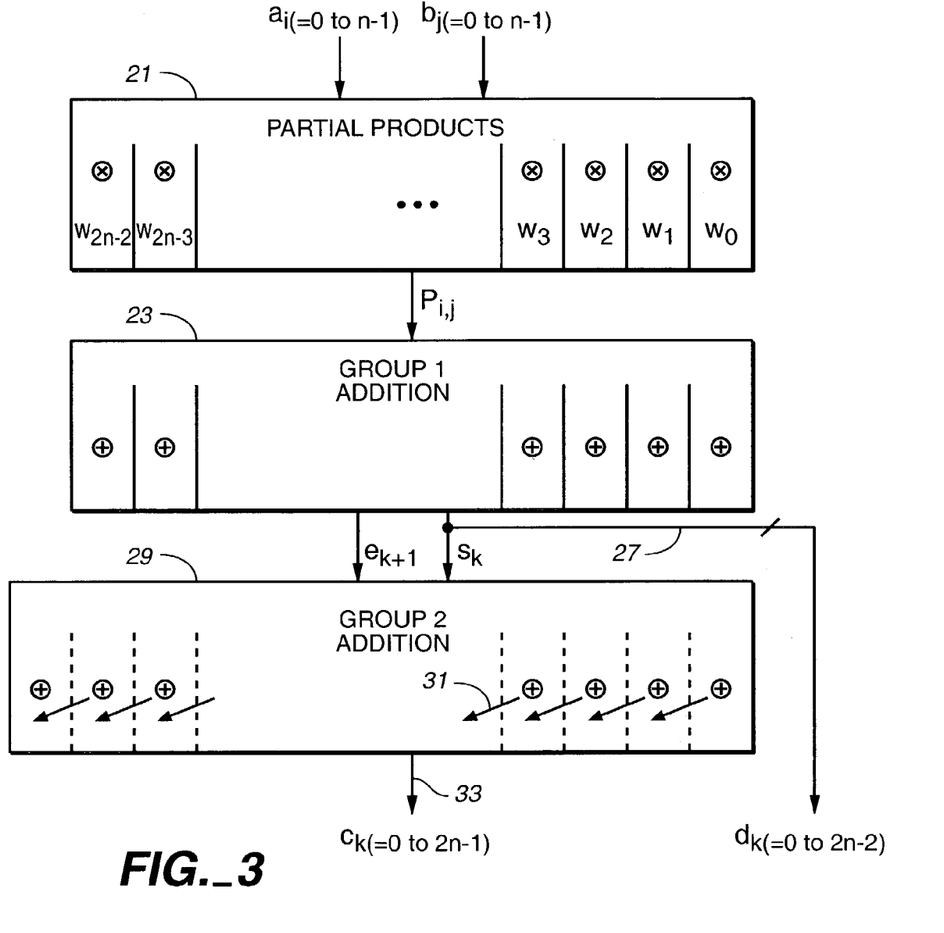
FIG. 3 is a schematic block diagram of general multiplier architectures in accord with the present invention.

FIG. 3 schematically represents this separation into two groups 23 and 29 of adders and the extraction 27 and 33 of the different products from the two groups. In particular, operand bits $a_i$ and $b_j$, where i and j both range from 0 to n−1, are received by an array 21 of AND gates (symbolized by circled x's) to produce a complete set of partial product terms $p_{i,j}$, each characterized by polynomial degree or weight $w_k$, where k=i+j and range from 0 to 2n−2. The partial products are then received by a first group 23 of addition structures (symbolized by circled +'s) which are separate for each polynomial degree or weight (symbolized by the solid lines 25). These addition structures reduce the product terms $p_{i,j}$ to a set of sum terms $s_k$ and a set of carry terms $e_{k+1}$. (For a given weight k, there can be several carry term lines $e_{k+1}$.) Since the first stage addition was carried out for each degree or weight separately without inputting any carries resulting from any of the addition operations, the sum terms $s_k$ represent the polynomial product terms, and extracted along bit lines 27 to form the polynomial product coefficients $d_k$, where k still ranges from 0 to 2n−2. In this extraction, any pairs of sum of terms of equal polynomial degree can be XORed to produce a single product bit for each degree. The sum terms $s_k$ and carry terms $e_{k+1}$ are input into a second group 29 of addition structures (again symbolized by circled +'s). But here, any carry terms (symbolized by diagonal lines 31 crossing dashed weight boundaries) are included in the addition structures' inputs. The second stage additions, possibly concluded by an array of carry-propagating adders, carry-save adders, or 4-to-2 reductors, reduce to a set of outputs 33 that represent the natural product bits $c_k$, where, due to incorporation of the carry terms, k now ranges from 0 to 2n−1. Thus, both polynomial and natural multiplication products are obtained and output from the circuit. This is generally not too much slower than a conventional fast natural multiplication architecture. Indeed, but for the fact that certain optimized structures are excluded by the requirement that carry term additions must be deferred until the second group of addition structures, the architecture is otherwise just as fast as other multipliers of similar construction. As for size, the additional hardware needed for extracting the binary product is negligible, for example a few extra bit lines or a few extra XOR gates. Note that while this illustrated embodiment multiplies two n-bit operands, the invention also works well with non-symmetric cases with different size operands (m×n multiplication and multiplication-accumulation, including l×n+n multiply-accumulate operations).

Figure 4:
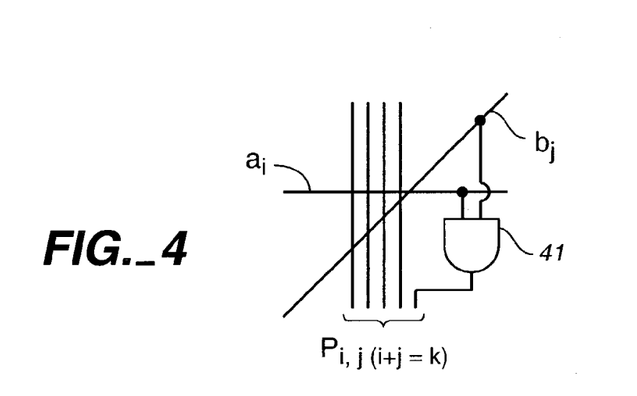
FIG. 4 is a schematic circuit portion for a partial product generator used in any multiplier circuit.

In FIG. 4, the partial product generating circuitry is seen to be composed of AND gates. Each AND gate 41 receives two inputs corresponding to operand bits $a_i$ and $b_j$. The AND gate outputs the partial product $p_{i,j}$ for that pair of operand bits, which joins a set of other partial products of equal polynomial degree or weight k (=i+j). Other partial product generating circuitry could be used. For example, they could be NAND gates, if logic at some point afterwards restores the correct polarity. This restoring step can be after the adder array, as if when we have carryOut, sum=a+b+c, then we also have not(carryOut), not(sum)=not(a)+not(b)+not(c). Similarly, we could use OR gates or NOR gates according to polarity conventions; or adders which work on inverted polarities in the inputs or outputs.

Figure 5:
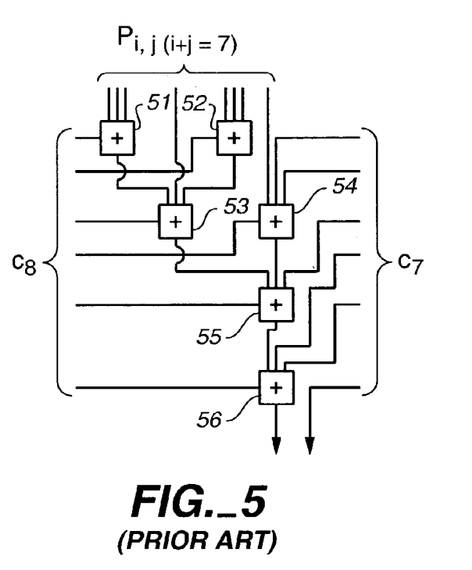
FIG. 5 is a schematic block circuit diagram of a prior art carry-save adder slice with eight partial product inputs of equal weight.
Figure 6:
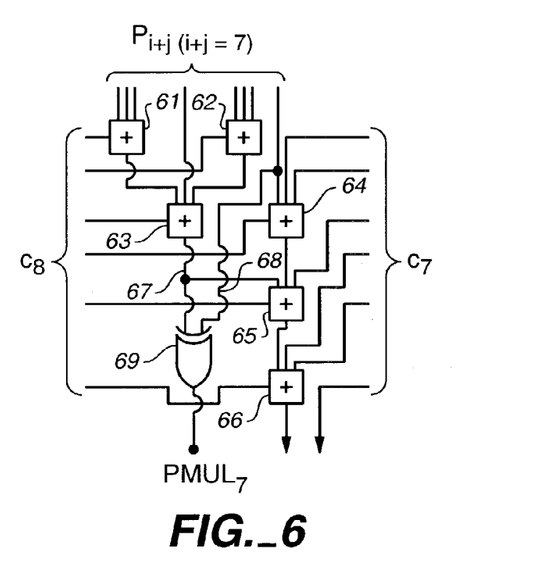
FIG. 6 is a schematic block circuit diagram of an embodiment of the present invention of a carry-save adder slice with an extra XOR gate for extraction of the polynomial product bit.
Figure 7:
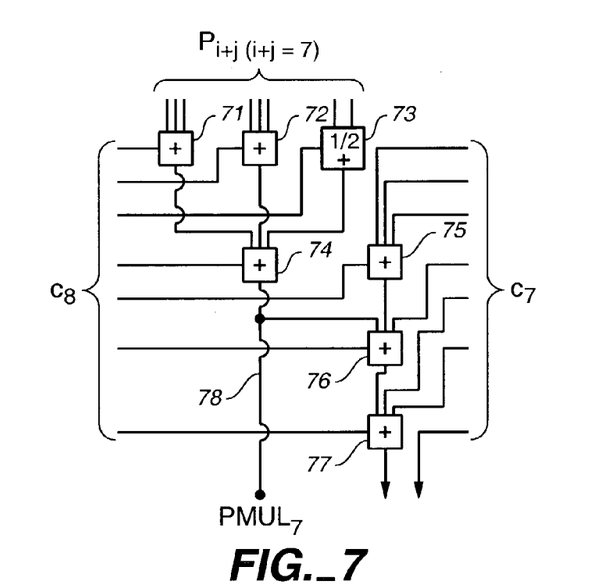
FIG. 7 is a schematic block circuit diagram of another embodiment of a carry-save adder slice in accord with the present invention, using a half-adder and bitline extraction of the polynomial product bit.
Figure 8A:
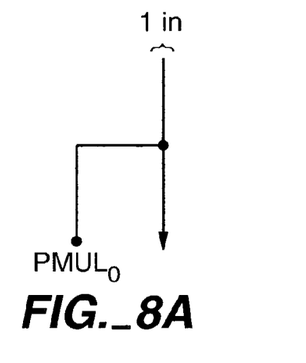
FIGS. 8A-8G show schematic block circuit diagrams for slices like FIG. 6 with from one to seven partial product inputs, with an extra XOR gate for each slice having an even number of partial product inputs.
Figure 8B:
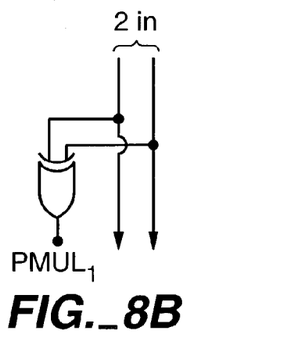
Figure 8C:
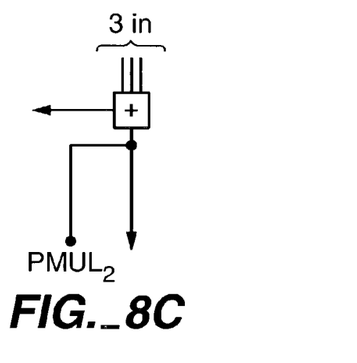
Figure 8D:
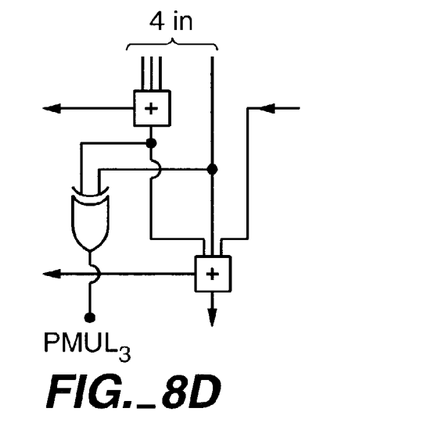
Figure 8E:
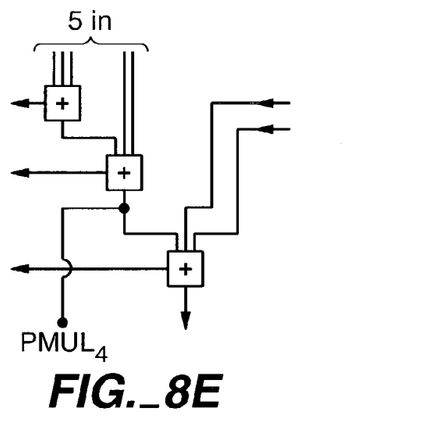
Figure 8F:
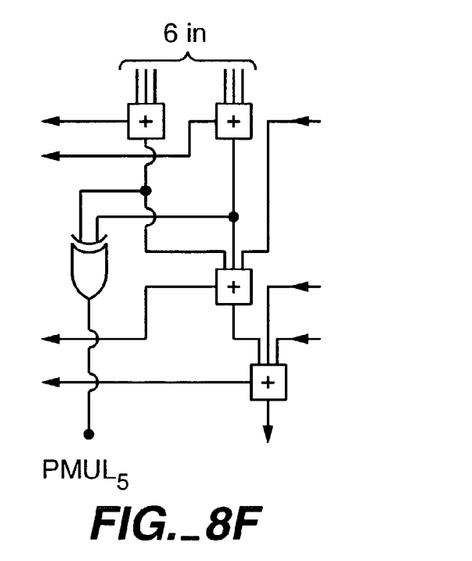
Figure 8G:
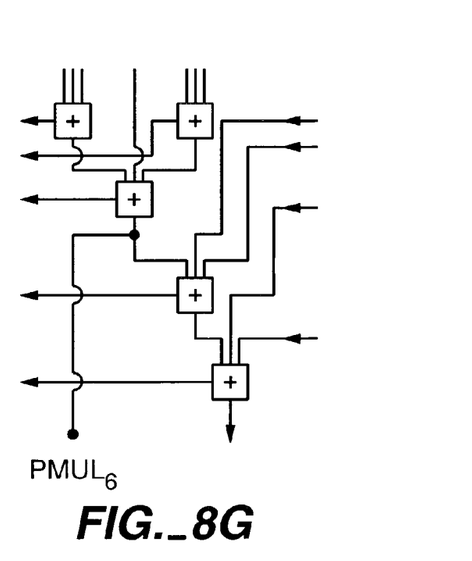

With reference to FIGS. 5-7, the partial product terms of the same degree or weight are added in an adder circuit, made up, for example, largely of full-adders. Full-adders are well known circuit elements that add three inputs to generate a sum and a carry. The inputs can be either partial products, sum terms of the same degree or weight from other adders in the slice, or carry terms received from the next lower weight slice of adders. All carry terms generated by the adders are of next higher weight and are supplied (for natural multiplication) to an adjacent slice. The adder circuitry in FIGS. 5-7 all have eight partial product inputs $p_{i,j}$ with i and j ranging from 0 to 7 and the weight i+j=7. Each circuit also has 6 carry-ins, 6 carry-outs, and 2 natural product output terms. Two output terms is a typical case, where, at the end, a fast adder (carry look-ahead, carry select or other) will collect the two output lines in each of the different slices to compute the final result. Other architecture, may generate only one or more than two output lines in the considered weight. FIGS. 6 and 7 also provide a polynomial product output term. Other adder slices of different weight may have a different number of partial product inputs. In FIGS. 5-7, the carry ins and carry outs are aligned as if the slices were identical. This is close to the real situation, although there may be one fewer (or one more) carry in term wherever the number of partial product inputs increase (or decrease) with increasing weight. (With increasing weight, the number of partial product inputs increase in the LSB half of the multiplication and decrease in the MSB half of the multiplication.)

In FIG. 5, a prior art carry-save adder slice adds with full-adders 51-53 as many of the partial products as possible without receiving carry inputs (here 7 out of the 8 partial product inputs). Even so, an $8^{th}$ partial product term is added to carry term inputs $c_7$ in a full-adder 54. The subsequent additions by full-adders 55-57 add the sums from full-adders 53 and 54 and also add carry inputs $c_7$. Carry terms $c_8$ of next higher weight are fed to an adjacent slice. The adder slice supplies a sum output, which can be added to any remaining carry input term in a subsequent carry-propagating adder stage. The arrangement performs an 8 to 2 reduction in 4 adder delays. Since FIG. 5 is an adder slice for a natural multiplier only, the binary product for finite field multiplication is not available.

The carry-save arrangement of FIG. 6 is substantially the same as FIG. 5, except that a polynomial product bit is created through as XOR addition. In FIG. 6, a modified carry-save arrangement of adders again has 8 partial product inputs of equal weight (i+j=k=7). Again, 7 of the terms are summed by full-adders 61-63. The resulting sum, together with the $8^{th}$ partial product input are extracted on lines 67 and 68 and input into an XOR gate 69 to obtain the polynomial term $PMUL_7$ with a degree 7. The sum from adder 63, the $8^{th}$ partial product input, and carry inputs $c_7$ are also added together using full-adders 64-66 to obtain a sum term and up to one remaining carry input term for subsequent addition by a carry-propagating adder to obtain the corresponding natural multiplication bit. Hence, the modified circuit carries out the same adds as in FIG. 6, but with an additional XOR gate extracting the polynomial product term. The adder delay is not significantly different from the FIG. 5 circuit.

In FIG. 7, a different modification of the carry-save arrangement of FIG. 5 introduces a half-adder circuit. Half-adders are well known circuits that take only two inputs and generate sum and carry outputs. Use of a half-adder allows all 8 partial product inputs in FIG. 7 to be summed. Three of the inputs are handled by a first full-adder 71, three other inputs are handled by a second full-adder 72, and the final two inputs are handled by the half-adder 73. The sum outputs of all three adders 71-73 are summed by full-adder 74 to obtain the polynomial product term $PMUL_7$. Adding the sum output of adder 74 to the carry inputs $c_7$ are handled by full-adders 75-77. Again, there is no significant penalty in adder delays. The FIG. 7 embodiment requires one extra half-adder, and one extra carry term, relative to FIG. 5. (The extra carry term, is due to the fact that a full adder never uses the full combination of sum and carry outputs. Indeed, the case (carry, sum)=(1,1) is not possible.)

With reference to FIGS. 8a-g, the embodiment of FIG. 6 is expanded to show a number of arrangements for different numbers of partial product inputs. The extra XOR gate is needed only when there is an even number of partial product inputs. For an odd number, the adders reduce to a single sum term prior to adding in the carries. Hence, for an odd number of partial product inputs, the slice only requires an extra bit line to extract the polynomial product bit term $PMUL_i$. Except for the two input case, the ascending side of the addition architecture (degrees or weights 0 to n−1) has one fewer carry input and hence only one sum input to the carry propagating adder stage that follows. For degrees or weights n to 2n−2, there will be both a sum and carry input provided by the slices to the carry propagating adder stage. For larger multipliers, e.g. a 32×32, the sequence of full-adders and XOR gates continue to expand in the LSB half of the multiplication, then reduces in the MSB half of the multiplication, with even numbered partial product inputs requiring the slice to have an XOR gate to supply the polynomial product term. A similar progression occurs for the use of a half-adder (needed for an even number of partial product inputs).

FIGS. 6, 7 and 8A-8G represent exemplary implementations of preferred embodiments in accord with the present invention. However, other implementations of the invention are also possible. For example, while the implementations shown above use one XOR or one half-adder for cases having an even number of partial product inputs, other possible implementations could choose to have more than one XOR or half-adder or could also use an XOR or half-adder in cases with an odd number of partial product inputs. While these alternatives would be less than optimal in terms of the number of gates, they might be chosen for easier layout, mapping into an FPGA device, or some other reason. Also, the location of the XORs or half-adders in the adder tree can vary from that shown. Further, while the configurations in FIGS. 6 and 7 have an equal number of carry inputs and carry outputs, FIGS. 8A-8G illustrate that this need not always be the case. And while the above implementations are built with full-adders, and half-adders or XOR gates, other building blocks, such as 4-to-reductors can be used.

The case of multiplication-addition, C=A·B+Z, is used both for multiplication-accumulation, C:=A·B+C or C=A·B+F·G+K·L, and for calculating the product of multiplicands, one or both of which is wider than the multiplier hardware, e.g. 160-bit wide multiplication using a 32-bit wide multiplication circuit. In these cases, a number to be added may be treated as if it were an additional set of partial products to added. For the case of natural multiplication-addition, all carries are included in the result. For polynomial multiplication-addition with coefficients in GF(2), all carries do not cross polynomial degree boundaries and thus are ignored.

For natural multiplication, the handling of bigger width can be reduced to a series of multiply and add operations. For a hardware word width of L bits and an operand width of M words, i.e. P=M·L bits, and coding operands in a natural way, $A=SUM_i(A_i \cdot 2^i)$, for index i from 0 to P−1, we can alternately represent the operands by words, $A=SUM_j (_jA \cdot w^j)$, where $w=2^L$, a lefthand index is used for word indexing, as in word A, for index j from 0 to M−1, and with bit $_jA^i=A_{j\cdot L+i}$. Then the product of two operands A and B is:

$$A\cdot B=\text{SUM}_k(\text{SUM}_{i+j=k}(_iA\cdot_jB)\cdot w^k).$$

The quantity $\text{SUM}_{i+j=k}(_iA\cdot_jB)$ is a sum of products of the same weight, and consequently the wide multiplication is done by a series of multiply $(_iA\cdot_jB)$ and addition $(\text{SUM}_k)$ operations. In general, the result of each multiply operation is coded on 2·L bits for the multiplication, plus a few more bits as the additions are done. What is over w, i.e. the result bits with weights greater than or equal to L, should be subsequently be injected when the k+1 indices are handled.

For polynomial multiplication with coefficients in GF(2), the notation used above for natural multiplication is again used, but with the symbol * being used to represent polynomial multiplication. $A=\text{SUM}_i(A_i\cdot x^i)$, for index i from 0 to P−1. This is handled by L-bit hardware as $A=\text{SUM}_j(_jA\cdot w^j)$, where the $_jA$ are L-bit polynomials, with index j from 0 to M−1 and $w=x^L$. The $_jA$ polynomials are defined as:

$$_jA=\text{SUM}_i(A_{j\cdot L+i}\cdot x^i)$$

with i from 0 to L−1. The polynomial product is then:

$$A*B=\text{SUM}_k(\text{XOR}_{i+j=k}(_iA*_jB)\cdot w^k),$$

with k from 0 to 2M−2, where the quantity $x_k=\text{XOR}_{i+j=k}(_iA*_jB)$ is a polynomial sum of polynomial partial products of the same degree, all coefficients with values in GF(2), that is, without reference to carries. The elementary polynomial products are coded in exactly 2L−2 bits, and no more bits are added as polynomial addition does not lead to degree increase. What is over W, i.e. the result part of degree greater than or equal to L, should be subsequently injected when the k+1 indices are handled, through polynomial addition (i.e. XOR) of the polynomials.

A possible further adaptation is to integrate the multiplication and addition in a multiply-accumulate operations. Most people usually think of a multiply-accumulate operation, C:=A·B+C, as first a multiply with an intermediate result A·B, and then an add to obtain the final result. However, this is not necessary, and multiply-accumulate hardware can be constructed to integrate the multiply and add, with both the partial products and the accumulate bits or coefficients to be added together. That is, form the partial products $A_i\cdot B_j$ then add them along with the accumulate bits $C_k$ of the appropriate weight. We need merely to provide an adder array that can also input the bits $C_k$ from an additional C bus. In the case of multiplication-addition of polynomial with coefficients in GF(2), we bring the partial product bits and accumulate bits in an undifferentiated way into the inputs of the adder array, and XOR everything of the same weight without the involvement of any carry bit:

$$D=A*B+C=\text{SUM}_k(\text{XOR}_{i+j=k}(\text{AND}(A_i, B_j),C_k)\cdot 2^k$$

For multiplication-addition of polynomials with coefficients in GF(2), we have to place at the input of a slice of degree k, all the necessary partial products, and the polynomial coefficient of degree k from C to be added, and to build the slices of the addition array so that the sums of these inputs are available as a polynomial output of that slice:

$$D=A*B+C=\text{SUM}_k(\text{SUM}_{i+j=k}(_iA\cdot_jB),_kC)\cdot w^k),$$

where the indices here refer to the weights of the N-bit polynomial coefficients.

Integration of the multiply-addition operation can also be generalized further to include, for example, A1*B1+ A2*B2+C, where A1*B1 is the present multiplication to be carried out, A2*B2 is the Montgomery (or Barrett) constant work for a modular extraction, and C allows for accumulation or extension to wide numbers. Also, while the above description has primarily been dedicated to the polynomial multiplication portion of a finite field operation, polynomial reduction operations in a finite field can also follow the multiplication, or even be integrated into a combined finite field multiplication-reduction operation. The possible operations that the multiplier circuit could perform might include those N×M-word multiply operations in the case where M=1, i.e. N×1-word multiply operations. For example, multiplication by a one-word constant b, possibly with a subsequent accumulation step (A*b or A*b+C), might be performed for extension to a multiple of larger size. Likewise, the above-noted dual multiplication and accumulate case might be applied to single-word multiplicands b1 and b2 (A1*b1+A2*b2+C), in either natural or polynomial multiplication, and in the latter case with or without subsequent modular reduction (Barrett, Montgomery or other type). Two or more parallel multiplier units, at least one of which is capable of being selected for natural or polynomial product output according to the present invention, may be provided to accomplish the more general operations.

So far we have described a multiplier able to handle polynomials or positive integers. The invention can be adapted to handle negative integers as well. For example, 2's-complement notation may be used to represent both positive and negative numbers:

$$A=-a_n\cdot 2^n+a_{n-1}\cdot 2^{n-1}+\ldots +a_0\cdot 2^0,$$

where $a_n$ is the "sign bit". If $a_n=1$, then A is negative; if $a_n=0$, then A is positive or equal to zero. With (n+1) bits, the values of A can range from $-2^n$ up to $2^n-1$. For 2's-complement, natural multiplication is:

$$A\cdot B = a_n\cdot b_n\cdot 2^{2n}-a_n(b_{n-1}\cdot 2^{2n-1}+\cdots +b_0\cdot 2^n)-$$
$$b_n(a_{n-1}\cdot 2^{2n-1}+\cdots +a_0\cdot 2^n)+\text{sum}_{0\leq i,j<n}(a_i\cdot b_j\cdot 2^{i+j})$$
$$= a_n\cdot b_n\cdot 2^{2n}-2^{2n+1}+2^{n+1}+[\text{not}(a_n\cdot b_{n-1})\cdot 2^{2n-1}+\cdots +$$
$$\text{not }(a_n\cdot b_0)\cdot 2^n]+[\text{not }(b_n\cdot a_{n-1})\cdot 2^{2n-1}+\cdots +\text{not }(b_n\cdot a_0)\cdot 2^n]+$$
$$\text{sum}_{0\leq i,j<n}(a_i\cdot b_j\cdot 2^{i+j})$$

The last term, $\text{sum}_{0\leq i,j<n}(a_i\cdot b_j\cdot 2^{i+j})$, is identical to positive multiplication on n*n bits. On this part we can easily extract the polynomial multiplication, as shown earlier in this document, as long as we organize the multiplier architecture so that no interferences exist with the rest of the terms in the calculation.

All of these other terms, i.e., high weight, negated partial products, and $2^{n+1}$ constant, have to be added to obtain the natural multiplication result. However, because addition is associative and commutative, the result will not change if this addition is performed later in the flow. In order that the addition of these terms be performed at optimal speed and cost, it is preferable to inject these terms to be added as soon as the polynomial extraction is completed.

Figure 9:
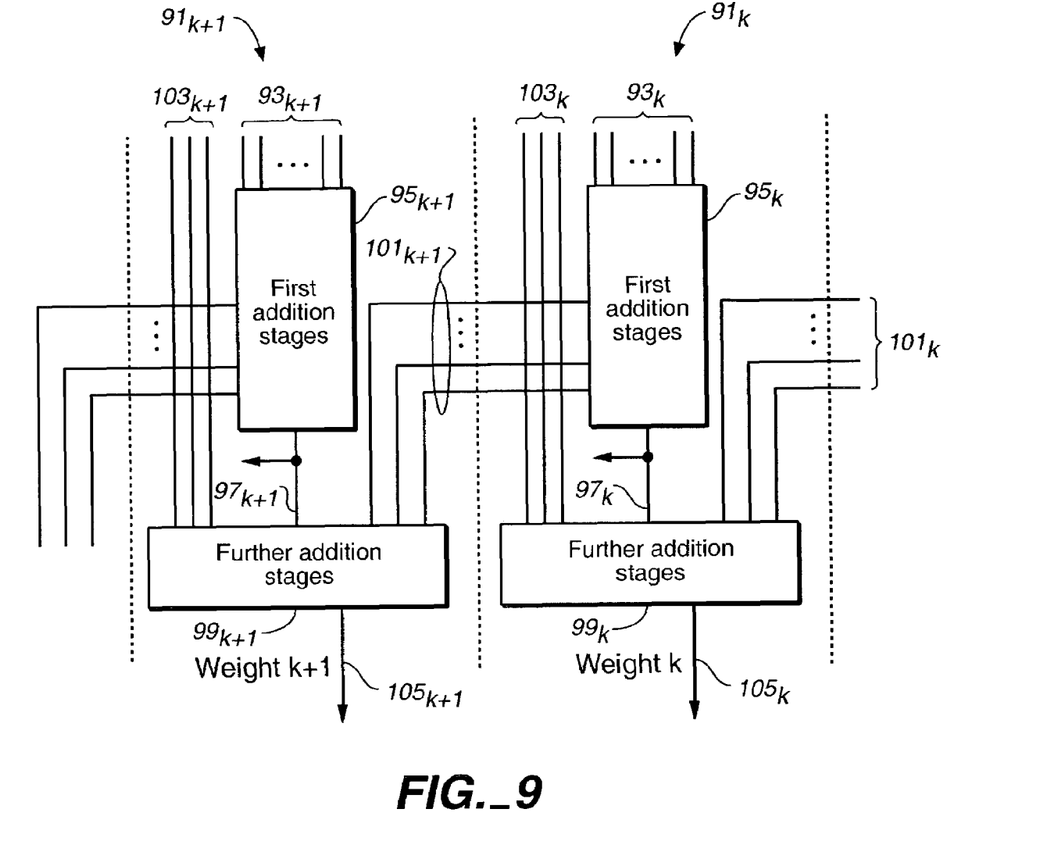
FIG. 9 is a schematic block circuit diagram for two adjacent weights k and k+1 showing an adder structure capable of also handling multiplication of negative integers.

FIG. 9 shows a block diagram of a portion of the multiplier architecture's adder structure for implementing the aforementioned 2's-complement multiplication. In FIG. 9, adder stages $91_k$ and $91_{k+1}$ for two adjacent weights k and (k+1) are seen to include first addition stages $95_k$ and $95_{k+1}$, respectively, which add positive partial products, 93k and 93k+1, of a particular weight (k or k+1) without use of any carry terms in order to obtain polynomial product bits of that same weight on the adder stages' XOR outputs, $97_k$ and $97_{k+1}$. These polynomial bits can be extracted as in the prior embodiments to yield a polynomial product. Further addition stages, $99_k$ and $99_{k+1}$, also receive the polynomial bits, $97_k$ and $97_{k+1}$, along with carry terms, $101_k$ and $101_{k+1}$, output from first addition stages of next lower weight. In order to handle both positive and negative integers, eiuuggtr0.g. in 2's-complement form, the negated partial products, $2^{n+1}$ bit (and other terms in the equation just described above) are input on bit lines, $103_k$ and $103_{k+1}$, of corresponding weight to the further addition stages, $99_k$ and $99_{k+1}$. (That is, the $2^{n+1}$ is provided only to the adder stage $99n+1$ of weight n+1). The further addition stages, $99_k$ and $99_{k+1}$, output natural product bits $105_k$ and $105_{k+1}$.

Such a multiplier is able to support:
(1) n*n positive multiplication, through zero-ing of the sign bits;
(2) (n+1)*(n+1) 2's-complement multiplication;
(3) n*n 2's complement multiplication, through sign extension to the (n+1) bit; and
(4) n*n polynomial multiplication, through polynomial product bit extraction, as explained.

The same method is applicable to m*n multiplication, or to multiplication-accumulation, by (a) sign-extension in order to have only positive representation for input lines to a polynomial multiplication (-accumulation); (b) separately processing the lines that relate to polynomial multiplication (-accumulation), i.e. partial products, XOR through adders, half-adders or simple XORs; (c) extracting the polynomial result; and (d) consolidating the array addition only after the polynomial result has been extracted.

What is claimed is:

1. A parallel multiplier hardware architecture that delivers both a polynomial multiplication product with coefficients over GF(2) and a natural multiplication product, the multiplier architecture comprising:
an array of AND gates with inputs connected to operand bits and with outputs providing a complete set of partial products of the operand bits, each partial product characterized by a bit significance or "weight";
an addition architecture arranged to add partial products of the same weight, the addition architecture constructed in multiple stages, a first group of stages arranged to add partial products without receiving any carry inputs from a lower weight portion of the addition architecture, a second group of stages arranged to add carry inputs from a lower weight portion of the addition architecture to results from previous stages, the stages in both groups providing carry outputs to a higher weight portion of the addition architecture; and
means connected between the first and second groups of stages for extracting the first stage addition result as a polynomial multiplication product, the natural multiplication product being extracted from the end of the second group of stages.

2. The multiplier architecture of claim 1 wherein the addition architecture comprises cascaded stages of parallel counters, with at least one counter in each column of partial products of the same weight, and wherein the means for extracting comprises bit lines connected to the least significant bit, representing polynomial product coefficients, from each first counter in the cascade.

3. The multiplier architecture of claim 1 wherein the addition architecture comprises a set of full adders arranged for adding the partial products and carries, each full adder receiving three inputs of equal weight and providing a sum output of the same weight and a carry output of next higher weight, a first group of adders not receiving any carry term as an input, the first group of adders arranged to reduce partial products of a given weight to a sum term, the means for extracting comprising bit lines connected to the sum terms representing polynomial product coefficients, the second group of adders receiving carry inputs and sum terms of a given weight and arranged to reduce the carry inputs and sum terms to natural product bits.

4. The multiplier architecture of claim 3 wherein the first group of adders includes at least one XOR gate reducing a pair of terms to one.

5. The multiplier architecture of claim 3 wherein the addition architecture also includes at least one half-adder connected to the first group of adders for reducing a pair of terms to one.

6. The multiplier architecture of claim 1 wherein the array of AND gates receive operand bits and provide partial products for more than one multiplication, and the addition architecture adds the partial products of the same weight from the more than one multiplication to provide both polynomial and natural multiplication results of the form (SUM[Ai*Bi]), where the Ai and Bi are the operands and any of the Bi operands can be one-word constants.

7. The multiple architecture of claim 6 wherein the addition architecture further adds to the partial products corresponding bits of identical weight of at least one accumulate or constant term to provide both polynomial and natural multiplication results of the form (SUM[Ai*Bi]+ SUM[Ci]), where Ci, . . . are the accumulate or constant terms.

8. A method of operating a parallel multiple hardware architecture in order to obtain, from two n-bit operands, both a polynomial multiplication product with coefficients GF (2) and a natural multiplication product for use in cryptographic and error-correcting-code applications, the method comprising:
generating with a gate array of said hardware architecture a complete set of partial products from operand bits, each partial product characterized by a bit significance or "weight" equal to the sum of the weights of the operand bits from which that partial product has been generated;
adding the partial products of the same weight in multiple stages of an addition architecture, a first group of stages adding the partial products without using any same weight carry results from lower weight additions, each addition generating a carry of next higher weight, a second group of stages adding sum results from the first group of stages with carry terms of the same weight; and
extracting polynomial product coefficients from the sum results obtained as outputs from the first group of stages of the addition architecture and extracting natural product bits from the sum results obtained as outputs from the second group of stages of the addition architecture.

9. The method of claim 8 wherein adding the partial products of the same weight comprises counting by means of a binary counter circuit the number of partial products that have binary value 1 to provide a count value having a least significant bit of the same weight as the partial products counted and one or more higher significant bits of relatively higher weight, then repeating the counting step an a cascade of counter stages using the bits of the count values obtained from the preceding counter stage until a maximum of two bits of each weight remain, then performing a final addition operation in a hardware adder array with carries on the pairs of remaining bits to obtain the natural multiplication product; and wherein extracting the polynomial product coefficients comprises extracting the least significant bits obtained from the first counting step.

10. The method of claim 8 wherein adding the partial products of the same weight is carried out solely with full adder circuits, each having three operand inputs, a sum output and a carry output.

11. The method of claim 8 wherein adding the partial products includes using at least one half-adder circuit in the first group of stages.

12. The method of claim 8 wherein extracting the polynomial product coefficients includes applying at least one XOR operation with logic gates in the first group of stages.

13. The method of claim 8 wherein generating by the gate array of partial products from operand bits is conducted for more than one multiply operation, and wherein adding the partial products by the addition architecture to obtain results for both polynomial product coefficients and natural product bits is also conducted for the more than one multiply operation, whereby the results have the form (SUM[Ai*Bi]), where the Ai and Bi are the operands and any of the Bi operands can be one-word constants.

14. The method of claim 13 wherein the adding step performed by the addition architecture further includes adding to the partial products corresponding bits of identical weight of at least one accumulate or constant term to provide results for both polynomial product coefficients and natural product bits having the form (SUM[Ai*Bi]+SUM[Ci]) where the Ci, . . . are the accumulate or constant terms.

* * * * *